(12) United States Patent
Ryu et al.

(10) Patent No.: US 12,455,269 B2
(45) Date of Patent: Oct. 28, 2025

(54) HYDROGEN SENSING DEVICE THAT CAN VISUALLY DETECT THE PRESENCE OF HYDROGEN THROUGH COLOR CHANGE ACCORDING TO THE WATER FORMATION REACTION

(71) Applicant: KOREA INSTITUTE OF SCIENCE AND TECHNOLOGY, Seoul (KR)

(72) Inventors: Yong-Sang Ryu, Seoul (KR); Yusin Pak, Seoul (KR); Jongsu Lee, Seoul (KR); Taehyun Kim, Seoul (KR); Eui-Sang Yu, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 345 days.

(21) Appl. No.: 18/107,763

(22) Filed: Feb. 9, 2023

(65) Prior Publication Data
US 2024/0027414 A1 Jan. 25, 2024

(30) Foreign Application Priority Data
Jul. 21, 2022 (KR) ........................ 10-2022-0090169

(51) Int. Cl.
*G01N 33/00* (2006.01)
*B32B 15/04* (2006.01)
(Continued)

(52) U.S. Cl.
CPC ......... *G01N 33/005* (2013.01); *B32B 15/043* (2013.01); *G01N 21/78* (2013.01); *B32B 2311/04* (2013.01); *B32B 2311/06* (2013.01); *B32B 2311/08* (2013.01); *B32B 2311/09* (2013.01); *B32B 2311/12* (2013.01); *B32B 2311/22* (2013.01); *B32B 2311/24* (2013.01); *B32B 2311/30* (2013.01); *G01N 2021/7763* (2013.01)

(58) Field of Classification Search
CPC ..................................................... G01N 33/005
See application file for complete search history.

(56) References Cited

U.S. PATENT DOCUMENTS

| 6,448,199 | B1 | 9/2002 | Choudhary et al. |
| 8,268,392 | B1 | 9/2012 | Muradov |
| 2021/0396659 | A1 | 12/2021 | Jang et al. |

FOREIGN PATENT DOCUMENTS

| KR | 10-2019-0020203 A | 2/2019 |
| KR | 10-2021-0156191 A | 12/2021 |

OTHER PUBLICATIONS

Machine translation of KR20190020203 (Year: 2019).*
(Continued)

*Primary Examiner* — Walter L Lindsay, Jr.
*Assistant Examiner* — Andrew V Do
(74) *Attorney, Agent, or Firm* — NSIP Law

(57) ABSTRACT

The disclosure relates to a hydrogen sensing device capable of visually detecting the presence of hydrogen through a color change according to a water-forming reaction by inducing the water-forming reaction between hydrogen and oxygen at the interface between a lower metal layer and a dielectric layer under a structure in which a lower metal layer, a dielectric layer, and an upper metal layer are sequentially stacked, and visually sensing the color change caused by the generated water.

13 Claims, 21 Drawing Sheets
(7 of 21 Drawing Sheet(s) Filed in Color)

(51) Int. Cl.
*G01N 21/78* (2006.01)
*G01N 21/77* (2006.01)

(56) References Cited

OTHER PUBLICATIONS

Machine translation of KR20210156191 (Year: 2021).*
Korean Office Action issued on Dec. 2, 2024, in corresponding Korean Patent Application No. 10-2022-0090169 (5 pages in English and 4 pages in Korean).
Lee, Young-Ahn, et al. "Highly sensitive gasochromic H2 sensing by nano-columnar WO3-Pd films with surface moisture." *Sensors and Actuators B: Chemical* vol. 238 (2017). pp 111-119.
Duan, Xiaoyang, et al. "Dynamic plasmonic colour display." *Nature communications* vol. 8. Issue 1 (2017): 14606. pp 1-9.
Baek, In Uk. "Study on color development of Al metal surface using MIM structure composed of Au nanostructure thin film and TiO2 thin film." Korea University Thesis for the Degree of Master. (2020). pp 1-70.

* cited by examiner

HYDROGEN SENSING DEVICE THAT CAN VISUALLY DETECT THE PRESENCE OF HYDROGEN THROUGH COLOR CHANGE ACCORDING TO THE WATER FORMATION REACTION

CROSS-REFERENCE TO RELATED APPLICATION

The present application claims priority to Korean Patent Application No. 10-2022-0090169, filed Jul. 21, 2022, the entire contents of which are incorporated herein for all purposes by this reference.

BACKGROUND OF THE INVENTION

Field of the Invention

The disclosure relates to a hydrogen sensing device capable of visually detecting the presence of hydrogen through a color change according to a water-forming reaction, and more particularly, to a hydrogen sensing device capable of visually detecting the presence of hydrogen through a color change according to a water-forming reaction by inducing the water-forming reaction between hydrogen and oxygen at the interface between a lower metal layer and a dielectric layer under a structure in which a lower metal layer, a dielectric layer, and an upper metal layer are sequentially stacked, and visually sensing the color change caused by the generated water.

DESCRIPTION OF GOVERNMENT-SPONSORED RESEARCH

This study was made with the support of the Ministry of Science and ICT [Project title: Development of filter and qualitative/quantitative analysis original technology for real-time measurement of on-site detection type nano plastics, Project Identification No.: 1711168030, Sub-Project Identification No.: 2021R1A2C2009236].

DESCRIPTION OF THE RELATED ART

Hydrogen energy is spotlighted as a next generation alternative energy source that meets the carbon neutral policy, and is being researched and developed in a wide range of manufacturing, separation, storage, and application technologies. However, the hydrogen gas of colorless and odorless has a risk of explosion if it is contained in the atmosphere at 4% or more. Therefore, it is necessary to immediately detect leakage of hydrogen in handling hydrogen such as keeping and storing hydrogen.

U.S. Pat. No. 8,268,392 relates to a hydrogen detector capable of visually determining whether or not there is a hydrogen leak through reversible color change, and this patent proposes a technology for immobilizing $MoO_3$, a hydrogen-sensing pigment, and Pd, a metal activator particle, on a porous glass substrate, and inducing a color change of a hydrogen-sensitive pigment through a reaction between the hydrogen-sensitive pigment and hydrogen.

In the paper by Lee, et al., Highly sensitive gasochromic H2 sensing by nano-columnar WO3-Pd films with surface moisture, Sensors and Actuators B: Chemical, 238, 111-1119 (2017), a technology for visually detecting hydrogen leakage by inducing a color change through a hydrogen reaction of tungsten oxide ($WO_3$) has been proposed. However, the technology presented in this paper induces a color change of a reactive material through a reaction between the reactive material and the hydrogen, similar to the technology disclosed in U.S. Pat. No. 8,268,392. However, there is a problem in that the reproducibility of color change is poor during repeated use because the recovery of the reactive material is low when the hydrogen is removed.

In the paper by Duan, et al., Dynamic plasmonic color display, Nature Communications, 8(1), 1-9 (2017), a display technology that induces color change through a redox reaction of Mg, a hydrogen-reactive metal, to $MgH_2$ has been proposed. However, the hydrogen-reactive metal reacts easily with oxygen and moisture when exposed to the atmosphere and there is a risk of explosion, so it is not suitable for use in hydrogen detection. In addition, like the patents and papers described above, this may be a technology that relies only on structural changes in reactive materials.

DOCUMENTS OF RELATED ART (Patent Document 1) U.S. Pat. No. 8,268,392 (Registered Sep. 18, 2012)
(Non-Patent Document 1) Lee, et al., Highly sensitive gasochromic H2 sensing by nano-columnar WO3-Pd films with surface moisture, Sensors and Actuators B: Chemical, 238, 111-1119(2017)
(Non-Patent Document 2) Duan, et al., Dynamic plasmonic colour display, Nature Communications, 8(1), 1-9(2017)
(Non-Patent Document 3) Baek, In-wook, a study on color development of Al metal surface using MIM structure composed of Au nanostructure thin film and $TiO_2$ thin film, Master's thesis for Korea University, August 2020.

SUMMARY OF THE INVENTION

The disclosure has been devised to solve the above problems, and has an object to provide a hydrogen sensing device capable of visually detecting the presence of hydrogen through a color change according to a water-forming reaction that induces a water-forming reaction between hydrogen and oxygen at an interface between a lower metal layer and a dielectric layer under a structure in which a lower metal layer, a dielectric layer, and an upper metal layer are sequentially stacked, and visually detects the color change caused by the water-forming reaction.

In order to achieve the above object, a hydrogen sensing device which visually detects presence of hydrogen through a color change according to a water-forming reaction according to the disclosure, includes a structure in which a lower metal layer, a dielectric layer, and an upper metal layer are sequentially stacked on a substrate, the structure has a structural color, in an environment where hydrogen and oxygen exist, water is formed by a reaction of the hydrogen and the oxygen at an interface between the dielectric layer and the lower metal layer, and the structural color is changed when the water is formed.

Each of the upper metal layer and the dielectric layer may include a material structure through which the hydrogen and the oxygen pass.

The lower metal layer may include a material that activates a catalytic reaction of the hydrogen and the oxygen.

The upper metal layer may include a nano-metal thin film layer in a form of a network through which the hydrogen and the oxygen pass.

The lower metal layer may include at least one of Pd, Pt, Ir, and Ru.

The dielectric layer may include a porous polymer film through which the hydrogen and the oxygen pass.

The dielectric layer may include at least one of poly{perfluoro(butenyl vinyl ether)} (PBVE), and perfluoro (2,2-dimethyl-1,3-dioxole) (PDD).

The upper metal layer may include a material that activates a catalytic reaction of the hydrogen and the oxygen.

The upper metal layer may include at least one of Al, Cu, Ni, Ag and Au.

In the environment where the hydrogen and the oxygen exist, the water may be formed by the reaction of the hydrogen and the oxygen at the interface between the dielectric layer and the lower metal layer, the water may be formed to a uniform thickness at the interface between the dielectric layer and the lower metal layer.

The water may be formed in a uniform thickness at the interface between the dielectric layer and the lower metal layer, and the structural color may be changed to another structural color by a Fabry-Perot resonance effect.

The water may be formed in a case that the hydrogen sensing device is exposed to the hydrogen in advance and the oxygen is supplied in a state in which the lower metal layer is hydrogenated.

In the environment where the hydrogen and the oxygen exist, the water may be formed by the reaction of the hydrogen and the oxygen at the interface between the dielectric layer and the lower metal layer, the water may be formed to a non-uniform thickness at the interface between the dielectric layer and the lower metal layer. The diffuse reflection of light may be caused by the water formed to the non-uniform thickness, and the structural color may be lost due to the diffuse reflection of the light.

The water may be formed in a case in which the hydrogen is supplied in a state in which the hydrogen sensing device is previously exposed to the oxygen.

The hydrogen sensing device capable of visually detecting the presence of hydrogen through a color change according to a water-forming reaction according to the disclosure has the following effects.

In an environment in which hydrogen leaks, water is formed by the reaction of hydrogen and oxygen, and the structural color of an etalon structure changes according to the water formation, so that it is possible to easily identify whether or not hydrogen leaks visually.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The disclosure proposes a technology capable of inducing a water-forming reaction and consequent color change in an environment in which hydrogen is present and visually detecting the color change.

The hydrogen sensing device according to the disclosure employs an etalon structure of metal-dielectric-metal (MDM) in which a Fabry-Perot resonance effect is induced. It is a well-known technique that various structural colors can be implemented by changing the thickness of a dielectric layer in such an etalon structure (see the non-patent document 3).

In a typical etalon structure, as the dielectric layer is fixed to a specific thickness, the structural color also shows only a specific color. The structural color changes in the form of a spectrum according to the thickness of the dielectric layer. Thus, if the thickness of the dielectric layer is variable, the structural color will also change according to the change in the thickness of the dielectric layer. Also, if the Fabry-Perot resonance effect in the etalon structure is obstructed, the structural color will be lost.

In the etalon structure of the disclosure, the thickness of the dielectric layer is variable depending on whether water is formed, and color change is caused accordingly. The thickness change of the dielectric layer is induced by a water-forming reaction, and the water-forming reaction means a reaction between hydrogen and oxygen. That is, in the etalon structure of the disclosure, the reaction between hydrogen and oxygen is induced to generate water, and the thickness of the dielectric layer is changed by the generated water, and the color is changed through the thickness change of the dielectric layer and the diffuse reflection of light by the water.

The reaction between hydrogen and oxygen may be assumed in an environment in which hydrogen exists, that is, an environment in which hydrogen leaks. Water is formed by the reaction of hydrogen and oxygen, and color change occurs because the thickness of the dielectric layer and diffuse reflection are caused by the generated water, and this color change can be visually identified. This principle means that it is possible to identify whether there is a hydrogen leak with the naked eye.

As the thickness change of the dielectric layer and diffuse reflection due to the water formation are prerequisites for color change, the etalon structure of the disclosure, that is, the hydrogen sensing device adopts the following configuration. In addition, for the water-forming reaction, the reaction between hydrogen and oxygen must be smoothly induced, and a configuration to meet this needs to be provided.

Hereinafter, the hydrogen sensing device capable of visually detecting the presence of hydrogen through a color change according to a water-forming reaction according to an embodiment of the disclosure will be described in detail with reference to the drawings.

Figure 1:
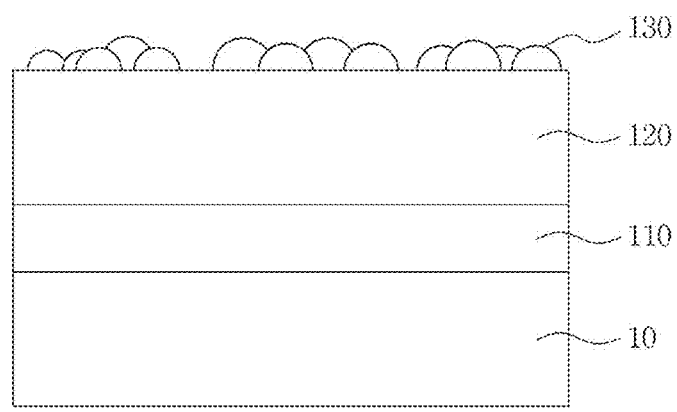
FIG. 1 is a block diagram of a hydrogen sensing device according to an embodiment of the disclosure.

Referring to FIG. 1, the hydrogen sensing device according to the disclosure includes a structure in which a lower metal layer 110, a dielectric layer 120, and an upper metal layer 130 are sequentially stacked on a substrate 10. The lower metal layer 110, the dielectric layer 120, and the upper metal layer 130 have an etalon structure of metal-dielectric-metal (MDM), and can realize a structural color by a Fabry-Perot resonance effect. The thickness of the dielectric may be selectively adjusted to correspond to the structural color to be realized.

In a structure in which the lower metal layer 110, the dielectric layer 120, and the upper metal layer 130 are sequentially stacked and the upper metal layer 130 is exposed to the outside, the reaction of hydrogen and oxygen to form water may occur at an interface between the dielectric layer 120 and the lower metal layer 110. For example, after the hydrogen and oxygen in the air pass through the upper metal layer 130 and the dielectric layer 120, and then reach the interface between the dielectric layer 120 and the lower metal layer 110, water may be generated by the reaction of hydrogen and oxygen at the interface between the dielectric layer 120 and the lower metal layer 110.

The lower metal layer 110 may include a material that activates a catalytic reaction of hydrogen and oxygen.

The dielectric layer 120 may include a dielectric film having pores through which both hydrogen and oxygen can pass. In the case of the upper metal layer 130, as in the dielectric layer 120, hydrogen and oxygen should be allowed to pass through, and may include a porous metal thin film layer, for example, a nano-metal thin film layer in the form of a network. Like the lower metal layer 110, the upper metal layer 130 may include a material that activates the catalytic reaction of hydrogen and oxygen. Examples of materials that activate the catalytic reaction of hydrogen and oxygen include Pd, Pt, Ir, Ru, and the like. In the dielectric layer 120 through which both hydrogen and oxygen can pass, for example, at least one of poly{perfluoro(butenyl vinyl ether)} (PBVE), and perfluoro(2,2-dimethyl-1,3-dioxole) (PDD) may be used as a porous polymer film. For reference, in the case of poly(methyl methacrylate) (PMMA), it allows hydrogen to pass through, but does not allow oxygen to pass through. As the upper metal layer 130, as described above, a material that activates the catalytic reaction of hydrogen and oxygen or at least one of Al, Cu, Ni, Ag, and Au may be used. As described above, the upper metal layer may be formed in the form of a porous metal thin film layer for the pass of the hydrogen and oxygen. In addition, the material of the substrate 10 on which the lower metal layer 110 is stacked is not particularly limited, and the silicon substrate 10 or the glass substrate 10 may be used as an example.

As an embodiment, the hydrogen sensing device according to the disclosure, as in the experimental example described below, may include a structure in which a lower metal layer (Pd), a dielectric layer (PBVE), and an upper metal layer (Pd) are sequentially stacked on a silicon substrate.

In order to improve bonding between the silicon substrate and the lower metal layer Pd, a Ti layer may be first deposited on the silicon substrate, and then the lower metal layer Pd may be deposited on the Ti layer. In addition, the Ti layer can also serve to prevent Pd from being detached from the layer or wrinkles occurring in the Pd layer due to a phase change of Pd from α phase to β phase during the hydrogenation process of Pd, in addition to improving the bonding strength of the lower metal layer (Pd).

Under such a structure, the water-forming reaction and the resulting color change process are as follows.

Figure 2:
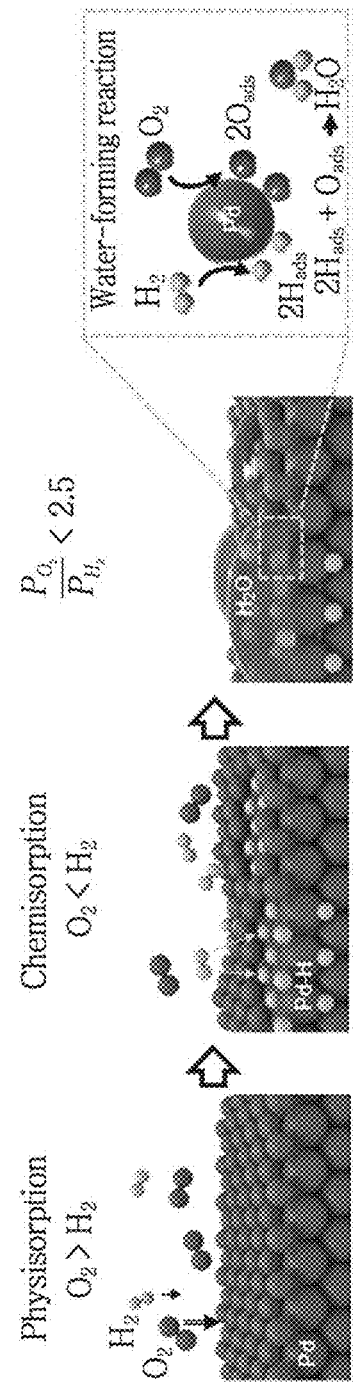
FIG. 2 is a schematic diagram for explaining a water-forming reaction.

Previously, it has been described that the water-forming reaction occurs at the interface between the dielectric layer and the lower metal layer. Specifically, the water-forming reaction occurs on the surface of a material that activates the catalytic reaction of hydrogen and oxygen constituting the lower metal layer. Referring to the schematic diagram of FIG. 2, in terms of energy, oxygen $O_2$ has a stronger physisorption to the metal surface than hydrogen $H_2$, and hydrogen has a stronger chemisorption to the metal surface than oxygen. That is, more oxygen than hydrogen is physically adsorbed on the Pd surface, and chemically more hydrogen than oxygen forms a chemical bond with the Pd surface. In this state, when an oxygen partial pressure $P_{O2}$ to a hydrogen partial pressure $P_{H2}$ is less than 2.5 ($P_{O2}/P_{H2}<2.5$), the water-forming reaction proceeds on the Pd surface. On the surface of Pd, a pair of hydrogen molecules and a pair of oxygen molecules are each split into single molecules, and the split hydrogen and oxygen molecules combine to form water molecules.

Water is formed on the Pd surface through the above-described process, and when the Pd surface is exposed to the outside, the water generated on the Pd surface evaporates immediately.

On the other hand, in the disclosure, since the dielectric layer is stacked on the lower metal layer, evaporation of water generated on the surface of the lower metal layer is suppressed by the dielectric layer. In addition, if the water-forming reaction is continuously performed in a state in which water evaporation is suppressed, the amount of water present between the dielectric layer and the lower metal layer will increase, and the increase in water causes the dielectric layer to expand and swell. The expansion and swelling of the dielectric layer means that the thickness of the dielectric layer changes, and the color of the structure also changes due to the thickness change of the dielectric layer. In addition, the water present between the lower metal layer and the dielectric layer induces the diffuse reflection of light, and a phenomenon in which the Fabry-Perot resonance effect is hindered by the diffuse reflection of light causes the structural color to become foggy. In this case, some of the water generated during the process of expanding the dielectric layer as water is generated is evaporated through the pores of the dielectric layer, but the amount of water generated is greater than the amount of water evaporated, so the expansion of the dielectric layer and color change accordingly proceed. The above-described formation of water and color change according to the water formation are identified through experimental examples to be described later.

Figure 3:
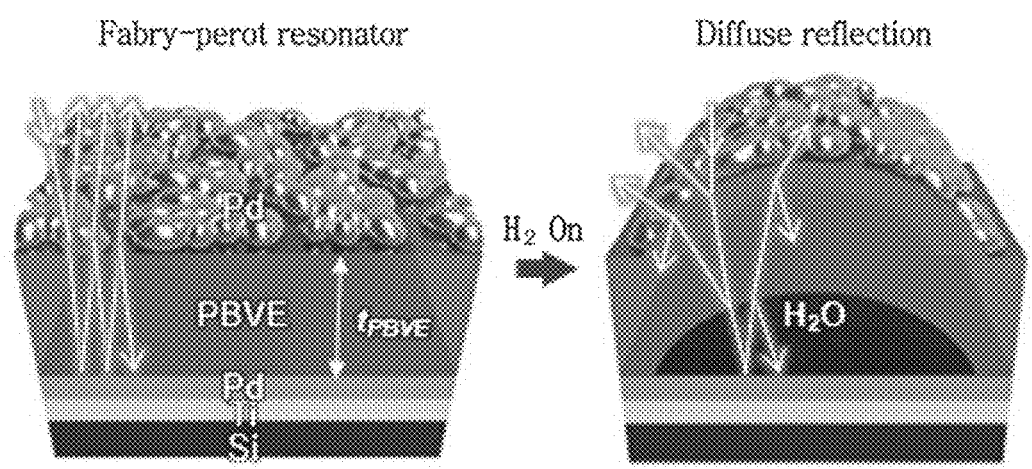
FIG. 3 is a schematic diagram for explaining diffuse reflection by water.

Meanwhile, when the dielectric layer expands due to water formation and color change occurs accordingly, two factors may be considered as factors for color change. One is the structural color change according to the thickness change of the dielectric layer, and the other is the diffuse reflection of light by water. As the dielectric layer is expanded by water and the thickness of the dielectric layer is changed accordingly, it can be expected that the color changes to a structural color corresponding to the changed thickness. In addition, the water formed between the dielectric layer and the lower metal layer refracts light and induces diffuse reflection of light (see FIG. 3), and as the Fabry-Perot resonance effect is hindered by the diffuse reflection of light, the originally designed structural color is lost.

The color change factor due to the diffuse reflection of water and the color change factor due to the thickness change of the dielectric layer according to the water formation can be considered to work simultaneously, and the predominance of each factor is determined according to the environment in which water is formed.

As described above, when the partial pressure of oxygen $P_{O2}$ to the partial pressure of hydrogen $P_{H2}$ is less than 2.5 ($P_{O2}/P_{H2}$<2.5), water formation proceeds. The dominant factor of color change varies depending on the environment in which oxygen is first adsorbed and then hydrogen is supplied to form water or the environment in which hydrogen is first adsorbed and then oxygen is supplied to form water.

First, in the case of an environment in which hydrogen is supplied to form water in a state in which oxygen is first adsorbed, hydrogen is supplied in a state in which oxygen, which has a stronger physical adsorption power than hydrogen, is previously adsorbed over the Pd surface, that is, the entire surface of the lower metal layer. Thus, water is scattered and formed in droplets on the surface of the lower metal layer, and as neighboring droplets merge, the water grows to a non-uniform thickness, and accordingly, the thickness of the dielectric layer also changes to a non-uniform size. For example, a change such as swelling of a dielectric layer in a hemispherical shape occurs due to the growth of water droplets.

In this way, even if the thickness of the dielectric layer is changed by the formation of water, as the dielectric layer is changed to a non-uniform thickness, the refractive index of the etalon structure is changed by the dielectric layer and the generated water, and diffusion reflection is caused by the water, resulting in obstruction of the Fabry-Perot resonance effect. Obstruction of the Fabry-Perot resonance effect means loss of structural color. In this case, that is, in the case of an environment in which hydrogen is supplied to form water in a state where oxygen is first adsorbed, the color change factor due to the diffusion reflection of water overwhelms the color change factor due to the thickness change of the dielectric layer according to the formation of water. This results in a phenomenon in which the structural color of the hydrogen sensing device changes to be foggy.

On the other hand, in the case of an environment in which oxygen is supplied to form water in a state in which hydrogen is first adsorbed, as hydrogen is supplied in a state in which hydrogen is chemically bonded in advance across the entire surface of the lower metal layer, water is formed with a uniform thickness on the surface of the lower metal layer. As the water layer grows to a uniform thickness over the entire surface of the lower metal layer, the thickness of the dielectric layer is also uniformly changed. In this way, as the thickness changes of the water layer and dielectric layer are uniform over the entire area, the diffusion reflection of light by water is minimized and the Fabry-Perot resonance effect is maintained.

If the water layer and the dielectric layer are regarded as one dielectric layer as a whole, it can be seen that the total thickness of the dielectric layer is increased by the height of the water layer compared to the original thickness. The structural color shows a spectral form according to the thickness of the dielectric layer, and only the structural color of the etalon structure is changed to a different color because the effect of the diffuse reflection of water is small and the Fabry-Perot resonance effect is effective.

Therefore, in an environment where oxygen is supplied to form water in a state where hydrogen is first adsorbed, the color change factor due to the thickness change of the dielectric layer according to water formation is more dominant than the color change factor due to the diffusion reflection of water.

In addition, as the Fabry-Perot resonance effect is effective, when the water layer continuously increases, the thickness of the dielectric layer also continuously increases to a uniform thickness, changing to white, the last color of the structural color spectrum. In the case of color change due to diffuse reflection of water, structural color is lost due to the water formation, resulting in a phenomenon in which the structural color changes to be foggy. This can also be regarded as a change in the structural color to white. The color change due to the diffuse reflection of water is a phenomenon in which the structural color is lost, while the color change due to the thickness change of the dielectric layer according to water formation is a phenomenon in which the structural color is finally changed to white in a state in which the Fabry-Perot resonance effect is effective. Thus, there is a similarity in the final colors of both, but a difference in the causes. The former may be referred to as a foggy phenomenon, and the latter may be referred to as a white-out phenomenon. In addition, the former fog phenomenon can be confirmed through Experimental Example 3, and the latter whitening-out phenomenon can be confirmed through Experimental Example 4.

In the above, the hydrogen sensing device according to an embodiment of the disclosure, that is, the hydrogen sensing device capable of visually detecting the presence of hydrogen through a color change according to a water-forming reaction has been described. Hereinafter, the disclosure will be described in more detail through experimental examples.

Experimental Example 1: Manufacturing a Hydrogen Sensing Device

A Ti layer (10 nm) and a lower Pd layer (10 nm) were sequentially stacked on a silicon wafer using a thermal evaporator (MHS-1800, Muhan; $10^{-7}$ Torr, 2.0 u/s). 6.0 wt % of PBVE polymer solution in which 9.0 wt % of PBVE polymer was diluted in a fluorine solvent (FC-43) was prepared and spin-coated at 900 rpm on the lower Pd layer. To remove air bubbles inside the PBVE polymer solution, the solution was left at room temperature for 1 hour and then heated on a hot plate at 50° C., 80° C., and 180° C. for 1 hour, respectively, to form a PBVE layer with a thickness of 590 nm. The PBVE layer was etched to various thicknesses through plasma etching. Subsequently, annealing was performed at 180° C. for 30 minutes to relieve the surface energy of the PBVE layer, and then an upper Pd layer (15 nm) in the form of a nano-thin film having a filling factor of 0.45 was formed on the PBVE layer through thermal evaporation.

Figure 4A:
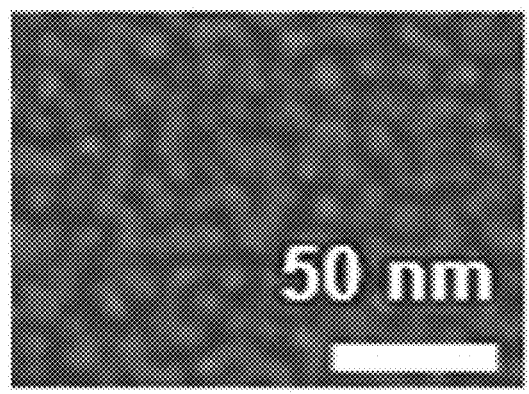
FIGS. 4A to 4C show an SEM photograph of a hydrogen sensing device manufactured according to Experimental Example 1 and a simulation result of a structural color according to a thickness of a PBVE layer.
Figure 4B:
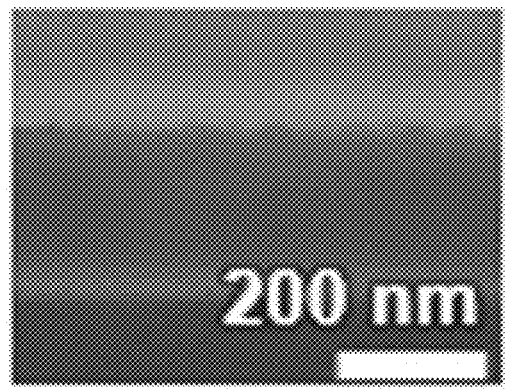
Figure 4C:
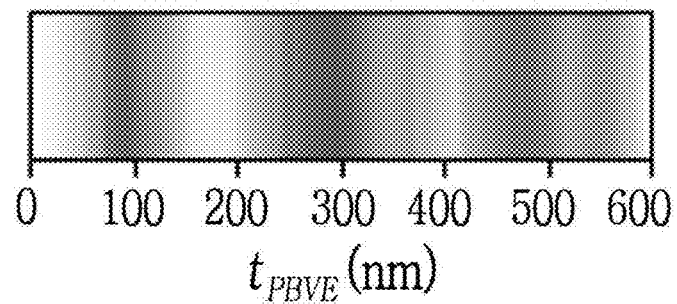
Figure 6A:
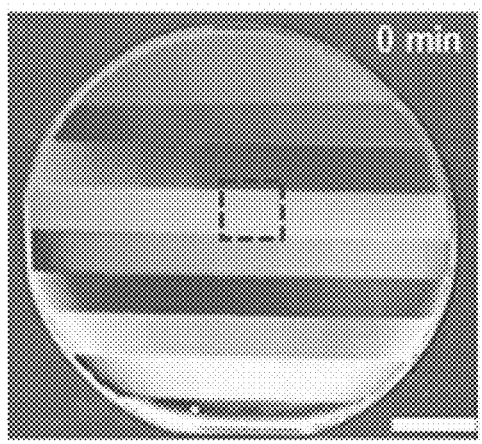
FIGS. 6A to 6D show an image monitoring a structural color change due to water formation according to Experimental Example 3.

FIG. 4A is the SEM picture of a top surface of the manufactured hydrogen sensing device. FIG. 4B is the SEM picture of a side cross-section of the manufactured hydrogen sensing device. FIG. 4C is the result of simulating the structural color according to the thickness of the PBVE layer (0 to 590 nm), and it was confirmed that the structural color of the hydrogen sensing device manufactured in Experimental Example 1 (see FIG. 6A) was very similar to the simulation result. In FIG. 6A, the PBVE layer at the bottom left had the thickness of 0 nm, the thickness of the PBVE layer increased as it went to the upper right, and the thickness of the PBVE layer at the top right was 590 nm.

In addition to the samples of the Pd/PBVE/Pd/Ti/Si wafer structure manufactured through the above process, a sample without an upper Pd layer (PBVE/Pd/Ti/Si wafer) was also separately manufactured.

Experimental Example 2: Identification of a Water-Forming Reaction

After exposing the sample (PBVE/Pd/Ti/Si wafer) without the upper Pd layer prepared in Experimental Example 1 to a carrier gas ($N_2:O_2=4:1$) of $H_2$ concentration of 10%, the water-forming reaction was monitored in real time under a microscope.

Each of FIGS. 5A 5B, 5C and 5D is a microscope image taken over time of the upper portion of the PBVE, and the figure above each of FIGS. 5A 5B, 5C and 5D is a cross-sectional schematic diagram showing the reaction state at each time point of FIGS. 5A 5B, 5C and 5D.

Figure 5A:
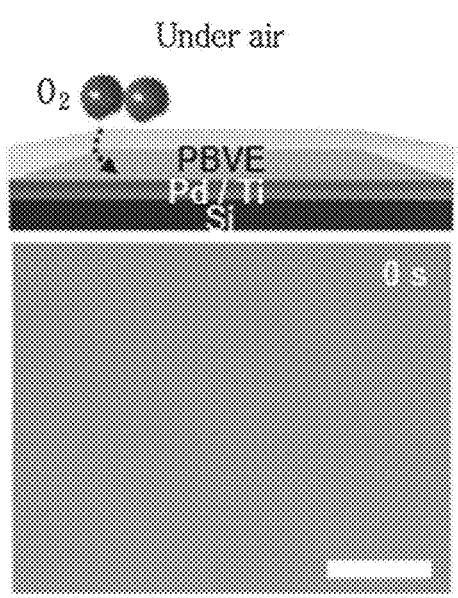
FIGS. 5A to 5D show an image monitored by a microscope for a water-forming reaction according to Experimental Example 2.
Figure 5B:
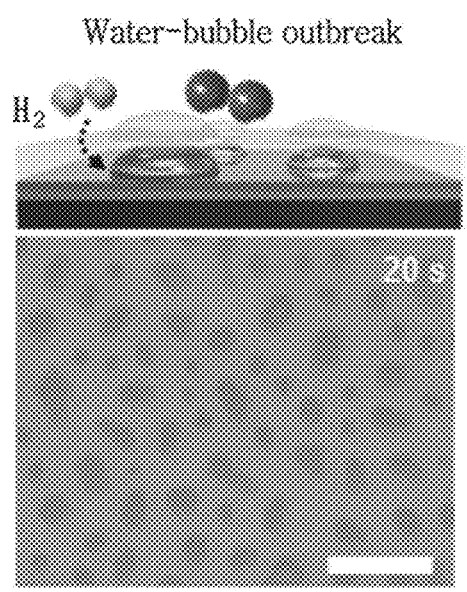
Figure 5C:
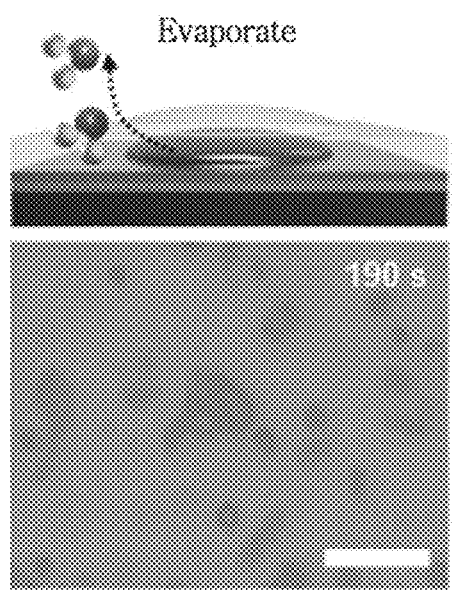
Figure 5D:
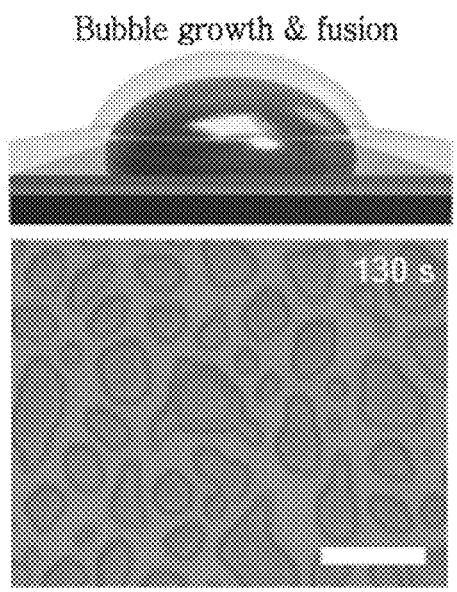

Referring to FIG. 5B, water was formed at the time of 20 seconds. Referring to FIG. 5C, it was confirmed that neighboring waters were merged at the time of 130 seconds and the water droplet was enlarged. Referring to FIG. 5D, it was confirmed that the hydrogen supply was blocked at the time of 130 seconds, and then the water evaporated and gradually disappeared at the time of 190 seconds. Referring to FIG. 5A, the water evaporated and disappeared completely at the time of 225 seconds, and the initial state was restored.

Experimental Example 3: Structural Color Change According to Water Formation

The color change characteristics of the sample (Pd/PBVE/Pd/Ti/Si wafer) prepared in Experimental Example 1 in a hydrogen exposure environment were observed. In the same conditions as in Experimental Example 2, the sample was exposed to the carrier gas ($N_2:O_2=4:1$) of $H_2$ concentration of 10% and blocked, and the resultant structural color change was monitored.

Figure 6B:
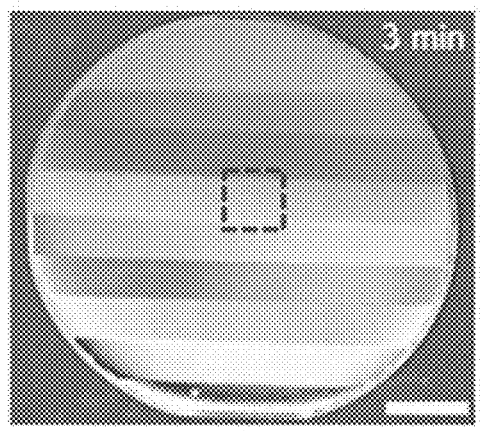
Figure 6C:
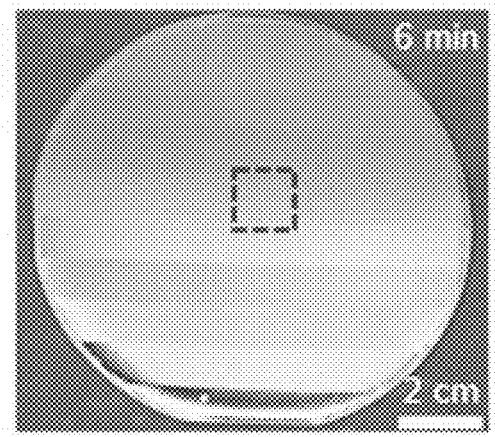
Figure 6D:
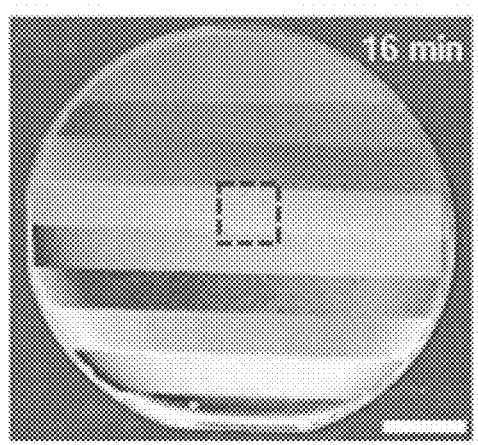

At the time of 3 minutes after exposure to hydrogen (see FIG. 6B), the initial structural color became blurred, and at the time of 6 minutes after exposure to hydrogen (see FIG. 6C), it became foggy and the structural color disappeared. When 10 minutes had elapsed, hydrogen exposure was blocked, and as a result of examination after 16 minutes had elapsed, it was confirmed that the structural color was restored (see FIG. 6D), and it was confirmed that after 29 minutes (see FIG. 6A), the original structural color was completely restored.

Figure 7A:
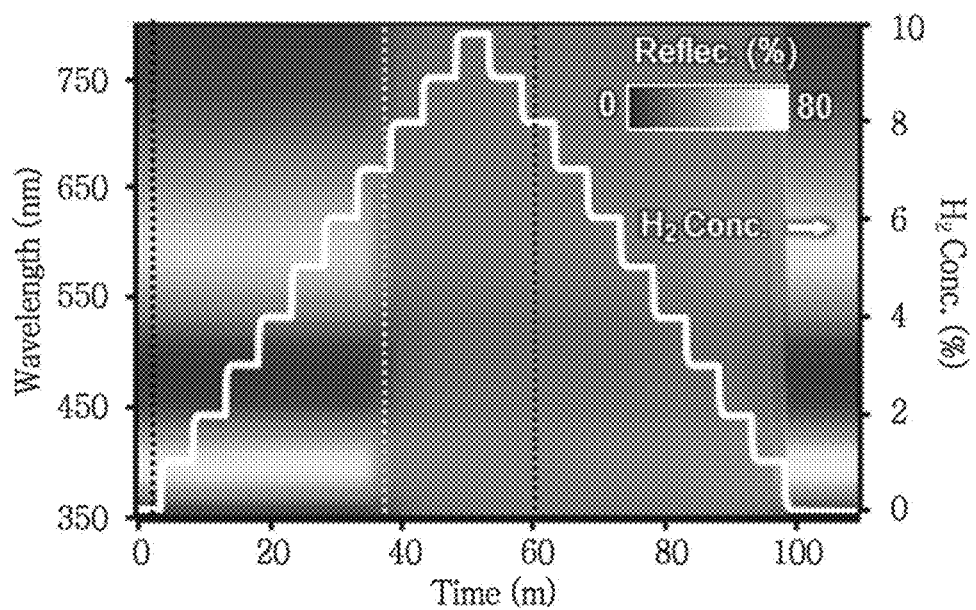
FIGS. 7A to 7D show results of analysis of changes in reflected light wavelength and peak according to hydrogen concentration.
Figure 7B:
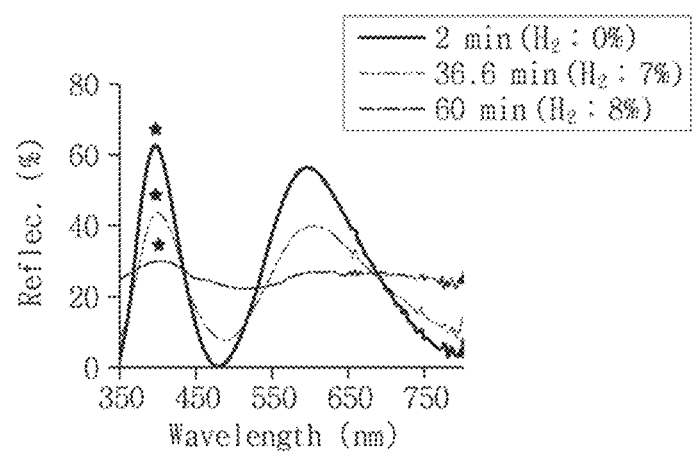

In addition, while increasing and decreasing the hydrogen concentration at intervals of 5 minutes, the spectral change of the area indicated by the red dotted line in of FIG. 6A was examined. From the point when the hydrogen concentration reached 7%, that is, when the oxygen partial pressure $P_{O2}$ to the hydrogen partial pressure $P_{H2}$ reached about 2.5 ($P_{O2}/P_{H2}$), the reflected light waveform curve in the visible light area became gentle, and in the case of the hydrogen concentration of 8%, it was confirmed that the reflected light waveform was almost flat (see FIGS. 7A and 7B).

Figure 7C:
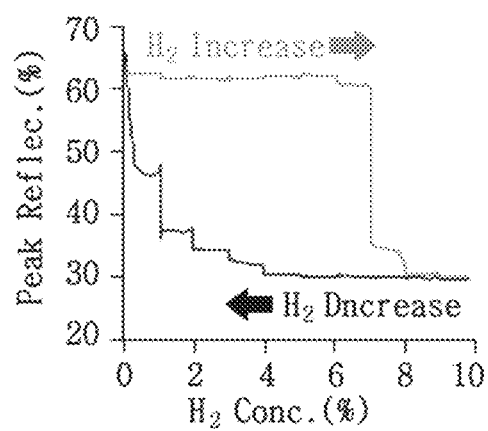

In addition, it was confirmed that the peak of the reflected light also dropped rapidly from the hydrogen concentration of 7% (see FIG. 7C). This is a result that disproves that the rapid peak change at a hydrogen concentration of 7% or more accelerates water formation and expansion at a partial pressure ratio of less than 2.5. The reason why the peak of the reflected light recovers slowly in the process of decreasing the hydrogen concentration is that hydrogen molecules previously adsorbed on the surface of palladium or absorbed into the inside are continuously involved in water formation. The reflection peak was recovered relatively quickly at a hydrogen concentration of 4% or less.

Figure 7D:
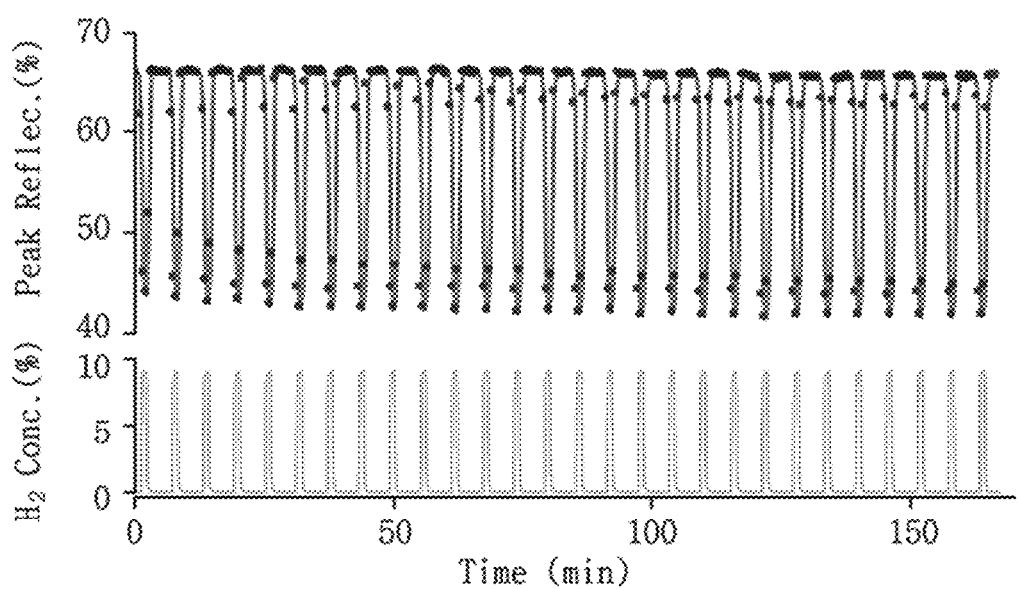

As a result of repeated experiments on the reflected light peak according to the increase and decrease of the hydrogen concentration, it can be seen that the recovery of the reflected light peak is very good as shown in FIG. 7D, and these results indicate that the reliability of hydrogen detection is excellent.

Experimental Example 4: Structural Color Change According to Water Formation

Experimental Example 3 was an experiment in which hydrogen was supplied in a state of prior exposure to oxygen and the resultant structural color change was observed. On the contrary, this Experimental Example 4 was an experiment in which oxygen was supplied in a state of prior exposure to hydrogen and the resultant structural color change was observed.

Figure 8:
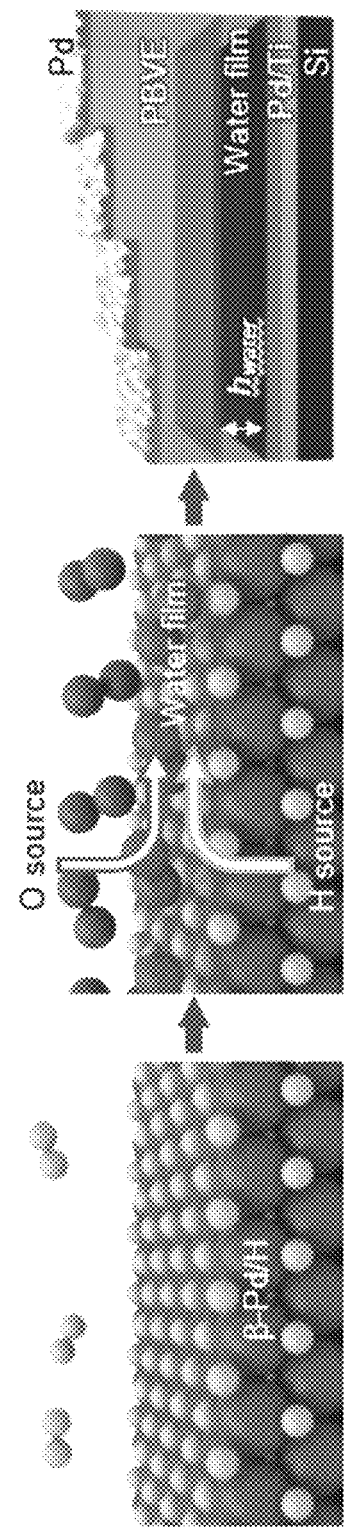
FIG. 8 is a schematic diagram of a water-forming reaction according to Experimental Example 4.

The sample (Pd/PBVE/Pd/Ti/Si wafer) prepared in Experimental Example 1 was previously exposed to nitrogen gas having a hydrogen concentration of 10% for 5 minutes to hydrogenate all Pd to β-Pd/h (see FIG. 8). Then, as a result of injecting 20% oxygen, it can be confirmed that the structural color of the sample gradually changed to white from bottom to top over time (see FIG. 9). In this way, the fact that the structural color of the sample does not change to white all at once but sequentially changes to white from bottom to top according to the thickness of the PBVE means that the Fabry-Perot resonance effect remains effective despite the formation of water.

Figure 9:
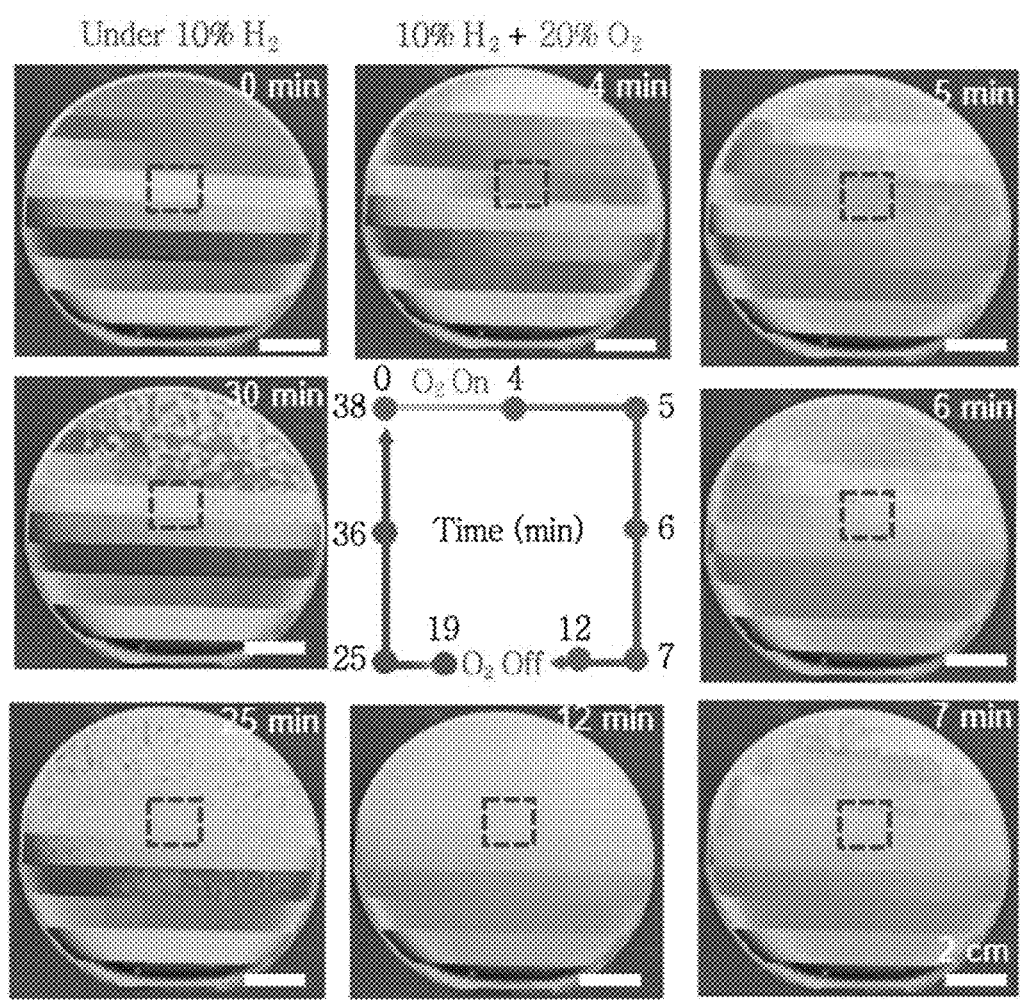
FIG. 9 shows an image monitoring a structural color change due to water formation according to Experimental Example 4.

Since the refractive index of water (n=1.33 to 1.34) is similar to that of PBVE (n=1.34 at 550 nm and 1.333 at 1.55 um), the formed water layer and PBVE can be seen as a single dielectric layer as a whole, and accordingly the thickness change of the water layer indicates a change in the thickness of the dielectric layer, and it can be seen that the color change shown in FIG. 9 is a change in the structural color on the structural color spectrum according to the change in the thickness of the dielectric layer. As the thickness of the water layer increases over time and the thickness of the dielectric layer also increases accordingly, the structural color starts to change to white from the lower area where the PBVE thickness is large to the upper area where the PBVE thickness is small.

Experimental Example 5: Application of Hydrogen Sensing Device

Figure 10:
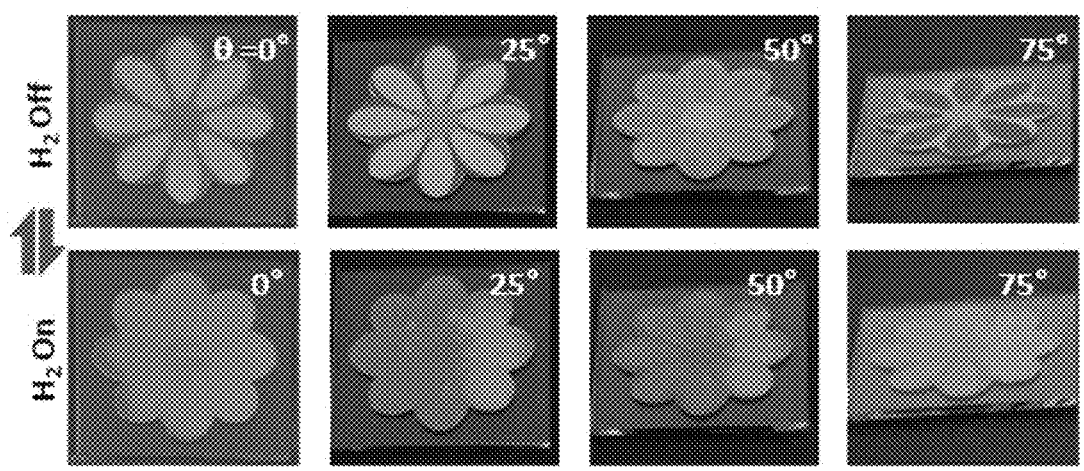
FIG. 10 shows a photograph showing a color change according to a viewing angle of the hydrogen sensing device manufactured according to Experimental Example 5.

The hydrogen sensing device was manufactured by applying the same process as in Experimental Example 1 on a glass substrate, and it was verified that color change could be confirmed at various viewing angles (0°, 25°, 50°, 75°) depending on whether or not hydrogen was supplied (See FIG. 10).

What is claimed is:

1. A hydrogen sensing device which visually identifies presence of hydrogen through a color change according to a water-forming reaction, the hydrogen sensing device comprising:
a structure in which a lower metal layer, a dielectric layer, and an upper metal layer are sequentially stacked on a substrate,
wherein the structure has a structural color, in an environment where hydrogen and oxygen exist, water is formed by a reaction of the hydrogen and the oxygen at an interface between the dielectric layer and the lower metal layer, and the structural color is changed when the water is formed, wherein in the environment where the hydrogen and the oxygen exist, the water is formed by the reaction of the hydrogen and the oxygen at the interface between the dielectric layer and the lower metal layer, wherein the water is formed to a uniform thickness at the interface between the dielectric layer and the lower metal layer, wherein the water is formed in a case that the hydrogen sensing device is exposed to the hydrogen in advance and the oxygen is supplied in a state in which the lower metal layer is hydrogenated.

2. The hydrogen sensing device of claim 1, wherein each of the upper metal layer and the dielectric layer includes a material structure through which the hydrogen and the oxygen pass.

3. The hydrogen sensing device of claim 1, wherein the lower metal layer includes a material that activates a catalytic reaction of the hydrogen and the oxygen.

4. The hydrogen sensing device of claim 1, wherein the upper metal layer includes a nano-metal thin film layer in a form of a network through which the hydrogen and the oxygen pass.

5. The hydrogen sensing device of claim 1, wherein the lower metal layer includes at least one of Pd, Pt, Ir, and Ru.

6. The hydrogen sensing device of claim 1, wherein the dielectric layer includes a porous polymer film through which the hydrogen and the oxygen pass.

7. The hydrogen sensing device of claim 1, wherein the upper metal layer includes a material that activates a catalytic reaction of the hydrogen and the oxygen.

8. The hydrogen sensing device of claim 1, wherein the upper metal layer includes at least one of Al, Cu, Ni, Ag and Au.

9. The hydrogen sensing device of claim 1, wherein the water is formed in a uniform thickness at the interface between the dielectric layer and the lower metal layer, and the structural color is changed to another structural color by a Fabry-Perot resonance effect.

10. A hydrogen sensing device which visually identifies presence of hydrogen through a color change according to a water-forming reaction, the hydrogen sensing device comprising:

a structure in which a lower metal layer, a dielectric layer, and an upper metal layer are sequentially stacked on a substrate, wherein the structure has a structural color, in an environment where hydrogen and oxygen exist, water is formed by a reaction of the hydrogen and the oxygen at an interface between the dielectric layer and the lower metal layer, and the structural color is changed when the water is formed, wherein the dielectric layer includes at least one of poly{perfluoro(butenyl vinyl ether)} (PBVE), and perfluoro(2,2-dimethyl-1,3-dioxole) (PDD).

11. A hydrogen sensing device which visually identifies presence of hydrogen through a color change according to a water-forming reaction, the hydrogen sensing device comprising:

a structure in which a lower metal layer, a dielectric layer, and an upper metal layer are sequentially stacked on a substrate, wherein the structure has a structural color, in an environment where hydrogen and oxygen exist, water is formed by a reaction of the hydrogen and the oxygen at an interface between the dielectric layer and the lower metal layer, and the structural color is changed when the water is formed, wherein in the environment where the hydrogen and the oxygen exist, the water is formed by the reaction of the hydrogen and the oxygen at the interface between the dielectric layer and the lower metal layer, the water is formed to a non-uniform thickness at the interface between the dielectric layer and the lower metal layer.

12. The hydrogen sensing device of claim 11, wherein diffuse reflection of light is caused by the water formed to the non-uniform thickness, and the structural color is lost due to the diffuse reflection of the light.

13. The hydrogen sensing device of claim 11, wherein the water is formed in a case in which the hydrogen is supplied in a state in which the hydrogen sensing device is previously exposed to the oxygen.

* * * * *